July 19, 1938.  C. R. ROBERTS  2,124,472
ATTACHMENT FOR CORN CULTIVATORS OR THE LIKE
Filed Nov. 16, 1937
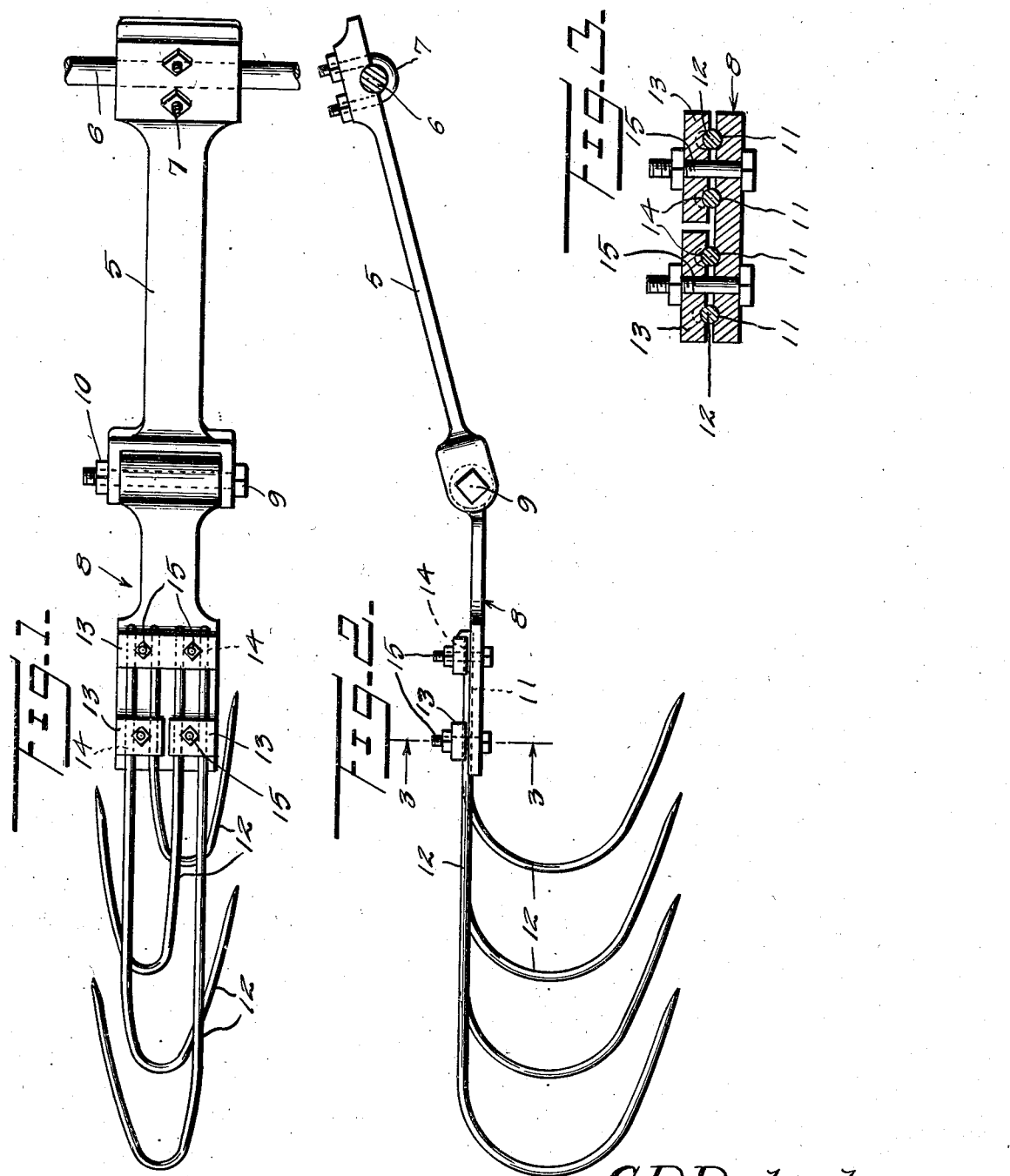
C. R. Roberts
INVENTOR
BY Victor J. Evans & Co.
ATTORNEYS
WITNESS Patented July 19, 1938

2,124,472

UNITED STATES PATENT OFFICE 2,124,472

ATTACHMENT FOR CORN CULTIVATORS OR THE LIKE

Charlie R. Roberts, Canton, S. Dak.

Application November 16, 1937, Serial No. 174,897

2 Claims. (Cl. 97—192)

My invention relates to new and useful improvements in attachments for corn cultivators or the like.

One of the principal objects of my invention is to provide an attachment for corn cultivators or the like adapted to pick up covered corn plants from the ground or the like to save them from destruction caused by being covered by a cultivation, as quite often happens.

Another object of my invention is to provide a device of the above described character which is readily attached to corn cultivators or the like already in use and without modifying the same.

A further object of my invention is to provide a device of the above described character which is simple in operation, durable in construction, efficient in use and economical in manufacture.

Other objects and advantages will be apparent from the following description, appended claims and annexed drawing.

Referring to the drawing wherein like reference characters designate like parts throughout the several views:

Fig. 1 is a top plan view of my invention.

Fig. 2 is a side elevation thereof.

Fig. 3 is a sectional view taken on the line 3—3 of Figure 2.

In practicing my invention I provide an elongated beam 5 adapted to be hitched to a transverse rod 6 of a corn cultivator or the like (not shown) by means of a single U-bolt 7 at one end thereof.

The opposite end of the beam 5 has pivoted thereto the forward end of a plate 8 by means of a pivot bolt 9 having a nut 10 securing the same in place. The upper face of the rear end of the plate is fashioned with a plurality of longitudinally extending grooves 11 for accommodating therein the upper forwardly extending ends of a plurality of tines 12. Securing blocks 13 fashioned with similar shaped grooves 14 are secured in clamped position to the ends of the tines by means of bolts and nuts 15 whereby said tines are secured in adjusted position to the rear end of the plate.

The tines are inflected downwardly and forwardly at the rear end, each tine being respectively longer than each preceding tine in a direction rearwardly of the beam and alternate tines being directed laterally in planes which intersect so that a comparatively wide long rake is produced. Said rake is adapted to pick up covered corn plants from the ground when moved thereover by the action of the corn cultivators and thereby save destruction of the plants by preventing them from being covered by cultivation. By adjustment of the nuts and bolts 15, the blocks 13 may be released in order to adjust the tines to desired positions.

From the foregoing it will be apparent that I have provided a simple and inexpensive attachment for corn cultivators whereby corn plants may be saved from destruction, thus effecting an economy in the harvesting of a corn crop.

What I claim is:

1. In a device of the character described, comprising, a beam adapted to be hitched to a corn cultivator or the like, and a plate pivoted to said beam and equipped with downwardly and forwardly inflected tines at the rear end thereof, each tine being respectively longer than each preceding tine in a direction rearwardly of the beam, alternate tines being directed laterally in planes which intersect so that a comparatively wide long rake is produced adapted to pick up covered corn plants and the like from the ground.

2. In a device of the character described, comprising, a beam adapted to be hitched to a corn cultivator or the like, a plate pivoted to said beam and equipped with downwardly and forwardly inflected tines at the rear end thereof, each tine being respectively longer than each preceding tine in a direction rearwardly of the beam, alternate tines being directed laterally in planes which intersect so that a comparatively wide long rake is produced adapted to pick up covered corn plants and the like from the ground, and means on said plate for adjusting said tines relative to each other and said plate.

CHARLIE R. ROBERTS.